(12) United States Patent
Eubelen

(10) Patent No.: US 7,154,112 B2
(45) Date of Patent: Dec. 26, 2006

(54) DISTANCE MEASUREMENT SENSOR

(75) Inventor: Emmanuel Eubelen, Dalhem (BE)

(73) Assignee: B.E.A. s.a., Angleur (BE)

( * ) Notice: Subject to any disclaimer, the term of this patent is extended or adjusted under 35 U.S.C. 154(b) by 68 days.

(21) Appl. No.: 10/972,831

(22) Filed: Oct. 25, 2004

(65) Prior Publication Data
US 2005/0285024 A1 Dec. 29, 2005

(30) Foreign Application Priority Data
Oct. 27, 2003 (EP) ................................ 03024644

(51) Int. Cl.
*G01C 3/08* (2006.01)
*G01C 3/22* (2006.01)
*G01S 17/48* (2006.01)

(52) U.S. Cl. .................. 250/559.31; 250/559.29; 250/559.38; 250/206.1; 250/208.2; 356/3.1; 356/4.1; 356/4.06; 356/623

(58) Field of Classification Search .......... 250/559.31, 250/559.29, 559.38, 206.1, 208.2, 208.6, 250/210, 221; 356/623, 301, 3.1, 4.01–4.06
See application file for complete search history.

(56) References Cited

U.S. PATENT DOCUMENTS

| | | | |
|---|---|---|---|
| 5,068,540 A * | 11/1991 | Tsuji ...................... 250/559.38 |
| 5,225,689 A | 7/1993 | Buckle |
| 5,633,718 A * | 5/1997 | Manning ...................... 356/613 |
| 5,814,808 A * | 9/1998 | Takada et al. ........... 250/206.1 |
| 5,923,428 A * | 7/1999 | Woodworth ................. 356/623 |
| 6,122,061 A * | 9/2000 | Pilone et al. ............... 356/623 |
| 6,271,918 B1 * | 8/2001 | Blais .......................... 356/625 |
| 6,492,652 B1 * | 12/2002 | Muller .................. 250/559.38 |
| 6,781,705 B1 * | 8/2004 | Waslowski et al. ......... 356/614 |
| 6,819,436 B1 * | 11/2004 | Ono ........................... 356/614 |
| 7,012,539 B1 * | 3/2006 | Waslowski et al. ......... 340/657 |

FOREIGN PATENT DOCUMENTS

| | | |
|---|---|---|
| DE | 100 55 689 A1 | 5/2002 |
| DE | 101 06 998 A1 | 5/2002 |
| EP | 1 209 487 A1 | 5/2002 |

* cited by examiner

*Primary Examiner*—Stephone B. Allen
*Assistant Examiner*—Davienne Monbleau
(74) *Attorney, Agent, or Firm*—Woodling, Krost and Rust

(57) ABSTRACT

A measurement sensor comprising a PSD (30) as an optoelectronic receiver, a transmitter (10, 12) for generating spots (22, 26), optics (14, 32) for reproducing the spots (22', 26') on the PSD (30) and means (44, 46, 48, 50, 52) for processing output signals (I1, I2) generated by said PSD (30) and for controlling the transmitter (10, 12) depending on the processed output signals (I1, I2) in order to measure the distance between the target (24) and the sensor by a triangulation technique is disclose closed. The transmitter comprises at least two optoelectronic signal sources (10, 12) for projecting at least two spots (22, 26) independent from each other on a target (24), the means (44, 46, 48, 50, 52) comprising a digitally controlled potentiometer (48) for balancing the output signals (I1, I2) and a digital processor (52) adapted for controlling the potentiometer (48).

19 Claims, 2 Drawing Sheets

DISTANCE MEASUREMENT SENSOR

Figure 1:
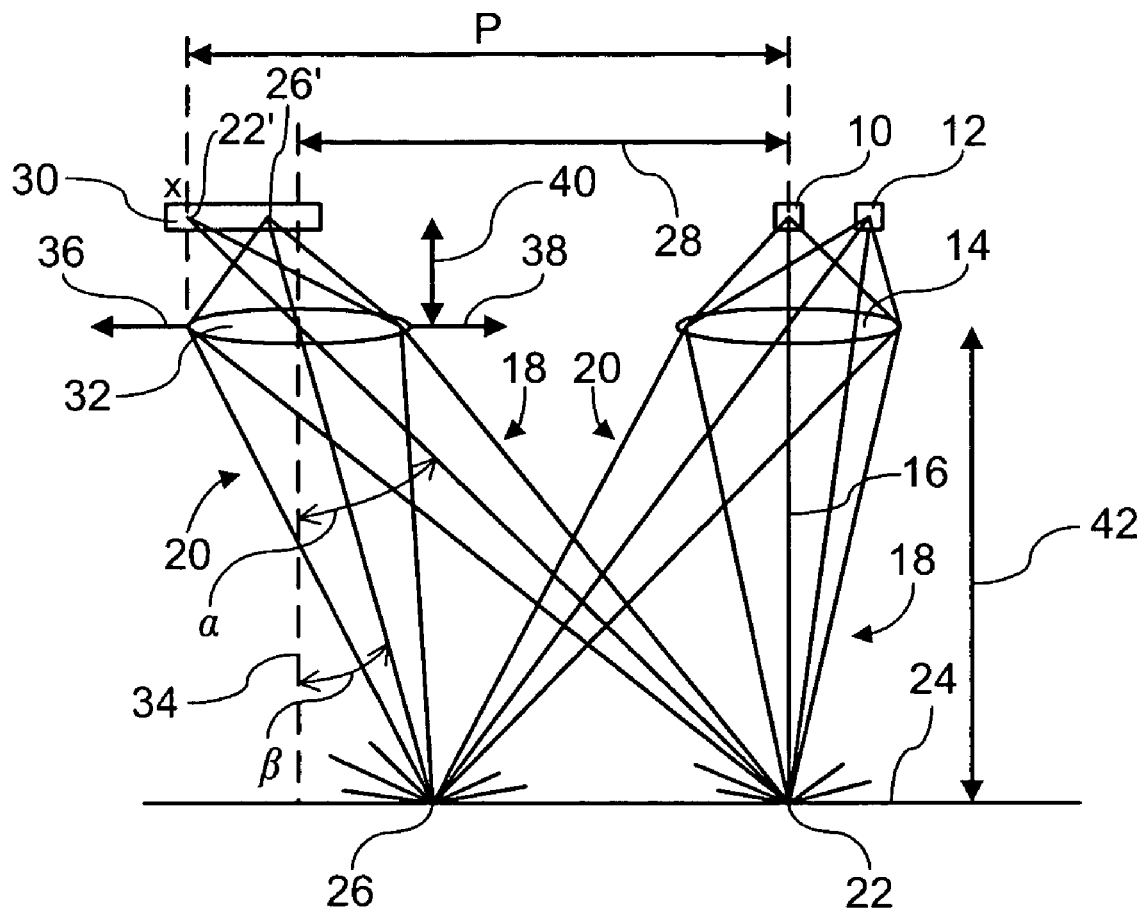

The invention relates to a distance measurement sensor according to the preamble of claim 1 and a distance measurement method according to claim 7.

Most of the known optoelectronic distance measurement sensors, which are usually used for automatic doors, are based on the triangulation principle. A transmitter LED and a corresponding lens send an infrared (IR) spot on the ground, and a receiver, placed at a given distance to the transmitter, measures the angle between the transmitted and received IR rays. This angle is directly related to the target distance and is measured by the position of the received spot on the receiver sensing device.

The sensing device is most often composed of a couple of photodiodes separated by a very thin frontier, or a single Position Sensing Device, Position Sensitive Device or Position Sensitive Detector (commonly referred to as PSD). The couple of photodiodes are used to determine on which of the diodes the spot is reflected. By measuring the difference of current generated by the photodiodes, it is possible to determine on which of the photodiodes the spot falls.

As the spot is relatively small compared to the detection area of the photodiodes, it can only be determined whether the spot is received by one photodiode or the other. A PSD acts as an optical potentiometer providing currents on its two outputs. The amount of the currents are proportional to the position of the received spot along the device.

The devices and methods known from prior art have the drawback that they allow only one distance (detection) threshold since the distance threshold is fixed by the position of the received spot on the receiver. In the case of two photodiodes, the reduction of the distance between the target and the sensor generates a displacement of the received spot from one photodiode to the other. The position of the frontier determines the distance threshold and is adjusted mechanically. This means that for two distance thresholds the position of each of the thresholds should be changed accordingly, which is impossible to achieve dynamically with a couple of photodiodes.

EP 1 237 011 A1 discloses an optoelectronic distance measurement sensor according to the preamble of claim 1 with one spot generated by means of a beam of light pulses of a light photo transmitter. A PSD receives the light pulses reflected by an object. The PSD generates two position signals which are processed in order to detect the distance between the object closed to the measurement sensor. Two or more quasi-simultaneous thresholds for the distance measurement of more than one spot at the same time are not provided with this known measurement sensor.

In DE 100 55 689 is shown a different type of a receiving sensor, namely a linear CCD sensor. This CCD sensor is able to provide a signal corresponding to a lot of different pixels forming a line. The redundancy corresponding to the use of the two lines allows the testing of the sensor.

U.S. Pat. No. 5,225,689 disclose a reflected light sensor having a light transmitter including at least two mutually independent light sources and a light receiver including at least two separately evaluable photosensitive elements. A switching point or distance limit of the light sensor can be continuously varied within a defined sensing range by inversely and continuously controlling currents of the light sources in accordance with a control voltage or by continuously varying a first and a second independent control voltage, thereby controlling gains of signals at the output of the photosensitive elements.

According to U.S. Pat. No. 5,225,689, two transmitters are used, however they are providing only one single spot of detection. The use of a varying ratio between the illumination of the two transmitters is just equivalent to the movement of a "virtual spot" described therein. This displacement provides the same effect as the movement of the receiving lens in order to modify the distance of detection, from which the dual photodiode sensor used to trigger the detection. Insofar, it is described to provide a way to vary the distance of detection when using a simple dual diodes detector, but for a single detection spot.

Therefore, it is an object of the present invention to provide a distance measurement sensor and a distance measurement method, which allow more than one distance detection threshold to be processed dynamically, allowing the quasi-simultaneous detection of distance over several different spots.

The distance measurement sensor according to the invention is characterized by what is specified in the independent claim 1 and the distance measurement method according to the invention is characterized by what is specified in the independent claim 7.

Advantageous embodiments of the invention are specified in the dependent claims.

According to the invention, said transmitter comprises at least two optoelectronic signal sources for projecting at least two spots independent from each other on a target, said means comprising a digitally controlled potentiometer for balancing the output signals I1, I2 an a digital processor adapted for controlling the potentiometer.

By using more than one optoelectronic signal sources and a PSD, it is possible to provide more than one detection spot and its their corresponding distance thresholds. In other words, for every optoelectronic signal source corresponding to one detection spot, a desired distance threshold is provided. By processing the output signals of the optoelectronic receiver and respective controlling of the optoelectronic signal sources, it is possible to use more than one spots for distance detection. Especially, the digital processor is used for a rapid electronic switching and adjustment of the threshold distance(s) of the sensor.

The fact that, the means comprise a digitally controlled potentiometer for balancing the output signals solves the problem of using a single PSD as optoelectronic receiver to detect the position of several spots projected in the target by the at least two optoelectronic signal sources.

The digital processor can also be adapted to control the at least two optoelectronic signal sources. By this, the digital processor can execute an algorithm for adjusting the distance thresholds in that it successively controls the optoelectronic signal sources and depending on the received output signals of the optoelectronic receiver controls the potentiometer in order to balance in a bridge configuration the output signals.

In a further preferred embodiment, memory means for storing values for setting the potentiometer are provided. The digital processor can store the setting values for potentiometer in the memory and reload the stored values depending on the desired distance threshold corresponding to each of the spots.

Multiple thresholds are also possible by storing different values corresponding to the same spot.

The at least two optoelectronic signal sources are preferably at least two IR LEDs, but other sources like laser are also possible.

The optics can comprise one transmitter lens for projecting spots from the at least two optoelectronic signal sources on the target and one receiver lens for projecting the spots reflected from the target on the optoelectronic receiver.

Preferably, mechanical adjustment means are provided for adjusting the position of the receiver lens so that the spots are reflected on the optoelectronic receiver. The processor can ease this adjustment by providing information to the user on the optimal position of the lens.

The invention relates also to a distance measurement method wherein at least two optoelectronic signal sources project at least two spots on a target, an optics reproduces the at least two spots on an optoelectronic receiver, and means process the output signals generated by the optoelectronic receiver and control the at least two optoelectronic signal sources depending on the processed output signals in order to measure the distance between the target and the sensor by a triangulation technique. A digitally controlled potentiometer balances the output signals of the optoelectronic receiver in order to achieve exact measurements.

Preferably, the means control the at least two optoelectronic signal sources in that the spots are projected alternatively on the target and their respective positions are successively analyzed by the means.

Preferably, the sensor according to the invention or the method according to the invention is used in a automatic door opener and shutter.

Additional objects, advantages, and features of the present invention will become apparent from the following description taken in conjunction with the accompanying drawings.

Figure 2:
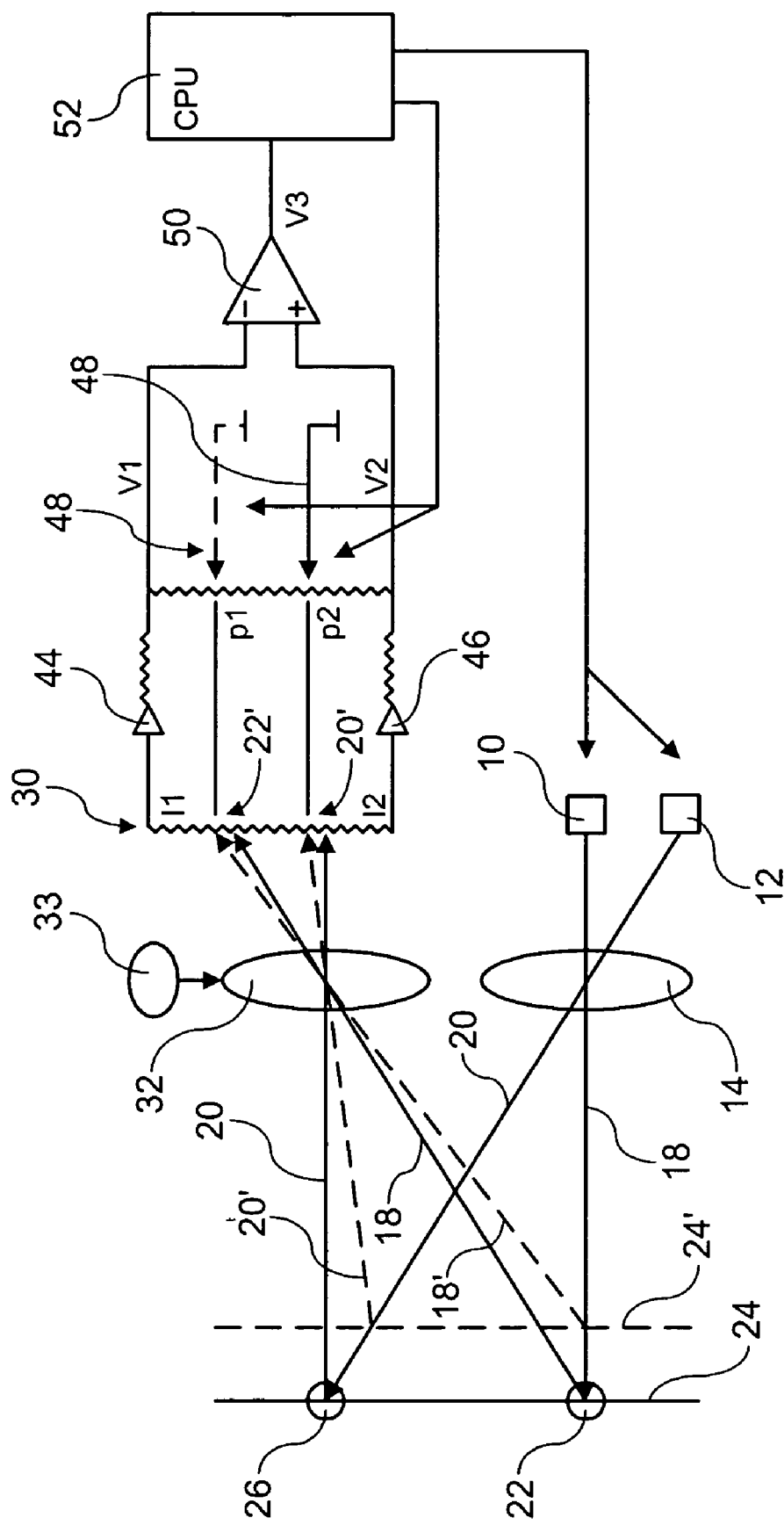

FIG. 1 shows an example of the basic measurement principle with two spots according to the invention, and FIG. 2 shows an embodiment of the sensor according to the invention.

FIG. 1 shows an optoelectronic distance measurement sensor which is based on an infrared triangulation principle. IR LEDs 10 and 12 as transmitter and a transmitter lens 14 are used to project spots 22 and 26 respectively on an object 24 such as the ground. The LEDs 10 and 12 generate two infrared (IR) beams 18 and 20. A first LED 10 is placed in the optical axis 16 of a first lens 14; a second LED 12 is placed eccentric to the optical axis 16. The first LED 10 generates a first beam 18 which is projected on a first spot 22 on an object 24. The second LED 12 generates a second beam 20 which is projected on a second spot 26 on the object 24. Particularly, the object is a ground when the optoelectronic distance measurement sensor is applied in an automatic door opener and shutter. The beams 18 and 20 are reflected from the object 24 and received by a PSD 30 as a receiver behind a receiver lens 32. The lens 32 can be adjusted in order to focus each of the spots 22 and 26 reflected from the object 24 on the PSD 30 as spots 22' and 26' respectively (shown by the arrows 36 and 38). Arrow 40 shows the focal length of the optic (fixed by optics).

As a mechanically adjusted distance 28 separates the receiver lens 32 and the transmitter lens 14 (LEDs 10, 12 and PSD 30 are mechanically fixed), the beams 18 and 20 return to the receiver lens 32 with angles $\alpha$ and $\beta$ respectively relative to the optical axis 34 of the receiver lens 32. These angles $\alpha$ and $\beta$ vary when the distance 42 between the optoelectronic distance measurement sensor and the object 24 changes. A change of the distance 42 between optoelectronic distance measurement sensor and object moves the received spots 22' and 26' on the PSD 30 of the receiver.

When several IR spots (in FIG. 1 two spots are shown, but according to the invention more than two spots can be used) are emitted from the LEDs 10 and 12 to the object 24, e.g. the ground, through a single lens such as lens 14, each of them will have a corresponding position on the ground. The Lambertian floor reflection sends back energy to the receiver lens 32, which recomposes the image of each spot 22' and 26' on their relative locations on the PSD 30. The PSD 30 is a photodiode having two anodes. The current ratio between both anodes directly depends of the position of the incident IR spots.

The position P of the first spot 22' generated by LED 10 on the PSD 30 will depend on the position of the spot 22 on the object 24 (fixed by the transmitter configuration of LED 10 and lens 14);

the focal length 40 of the receiver optic (fixed by optics);

the distance between transmitter lens 14 and receiver lens 32 (fixed by mechanics, but adjustable, see arrows 36 and 38);

the position of the movable receiver lens 32 versus the PSD 30; and finally the distance 42 between the sensor and the object 24 (in case of an automatic door opener or shutter, this depends on the installation height of the sensor or the target presence)

This is also valid for the second spot 26 generated by the second IR LED 12.

The position of the spots 22 and 26 on the object, the items 28 and 40 are fixed by the sensor construction and cannot be modified. Items 36 and 38 are used for calibrating the sensor versus the installation height. The horizontal position of the receiver lens 32 can be mechanically adjusted in order to send the received spots 22' and 26' on a given location of the PSD 30. The distance 42 is used to initiate detection. If the distance 42 to a target is below a given threshold, detection has to be triggered.

As the spot position on the PSD 30 will provide electrical levels, which are proportional to the position of the received spot 22' or 26', a processor can then adjust the detection threshold by setting electronically a specific potentiometer value for all spots.

One essential difference between prior art and the invention is the time multiplexing of several spots 22' and 26' on the same PSD 30. The spots 22 and 26 can be sent alternatively and their respective position are successively analyzed by the processor of the PSD 30. The standby position of each spot 22' and 26' (on the PSD 30) is different because it depends not only on the distance of the sensor to the object 24 or target, but also of its location on the floor (if the object 24 is the floor).

The position of each detection threshold is therefore specific for each spot 22 and 26 and is computed by the processor following the detection height. The computed detection threshold for each spot can be stored in a non-volatile memory. The number of spots received by the PSD 30 (two in this embodiment) is only limited by the resolution of the PSD and the scanning time. Alternatively, an IR spot could be a swept over a small angle instead of using two or more spots generated by different sources.

In the context of the invention, the PSD can be considered as an "optical potentiometer". As has been already stated, it provides two current outputs whose current ratio is proportional to the position of the received spot along the PSD. It can then be concluded that the received spot defines the position of the "optical potentiometer" tap.

The electronic processing of the currents received from the PSD 30 is based on a bridge principle and shown in FIG. 2. Similar amplifiers 44 and 46 are respectively connected to the two outputs of the PSD 30 and amplify a respective current I1 and I2 received from the PSD 30. A potentiometer 48 is then used to balance the currents I1 and I2 before entering as respective voltages V1 and V2 a differential amplifier 50, which measures the difference between the two balanced signals.

The current I1 and I2 generated by the PSD 30 depend on the position of the spots 20' and 22' which are reproduced by means of the receiver lens 32 on the PSD 30. In FIG. 2 a displaced object 24' is shown. The distance between this displaced object 24' and the sensor is smaller than the distance between the object 24 and the sensor. It can be seen that the spots 20' and 22' are shifted from their positions when reproduced from the object 24. Therefore, the currents I1 and I2 change and the detection of the distance between the displaced object 24' and the sensor can be recalculated based on the changed currents I1 and I2.

The potentiometer 48 is controlled by means of a digital processor 52 in order to dynamically balance the two lines conducting the two currents I1 and I2 from the PSD. This type of digitally controlled potentiometer (in the following also referred to as DIGIPOT) is able to be set by a computer very rapidly and to switch between several values at the rhythm of the switching between the different LEDs 10 and 12.

Practically, the CPU activates the first LED 10. A spot 22 is sent to the floor 24, is reflected and comes back through the receiver lens 32 and stimulates the PSD 30. Because the current I1 is higher than I2, the digital processor 52 sets the DIGIPOT on the equivalent P1 position in order to obtain a perfect equilibrium between V1 and V2 when the spot reaches the distance threshold. This has to be done during a set up procedure.

When the digital processor 52 activates the second LED 12 (blue), a second spot 26 is sent to the floor 24. A different situation appears, since current I2 is now larger than current I1, and the digital processor 52 sets the DIGIPOT on the P2 position to obtain V1=V2–>V3=0 when the distance threshold is reached.

The DIGIPOT values are stored definitively in an EEPROM after a set up procedure. They do not have to be modified until the detection distance is not changed. The digital processor 52 updates the DIGIPOT value every time it changes between the different possible LEDs 10 and 12 and corresponding emitted spots 22 and 26.

The detection distance can be electronically adjusted (for example by the use of a remote control); no mechanical adjustment is necessary. The digital processor 52 will then change the DIGIPOT value to move the distance threshold.

During standby, because the distance sensor-to-floor is higher than the detection distance, the equilibrium between V1 and V2 is broken and V2 is always higher than V1. V3 is therefore positive. When the distance between the target and the sensor is equal to the limit, V3 will switch to a negative voltage, which will trigger detection.

The advantage of working with a balanced system can clearly be understood by the following facts: The higher the dead zone (distance between ground and threshold) and the floor reflectivity, the higher the difference between voltage V2 and voltage V1 and then the higher is voltage V3, but it stays of the same sign. This is the fundamental advantage of such a technique, because it becomes then insensitive to ground reflectivity variations like the one generated by rain, snow, etc.

The receiver lens 32 is horizontally adjustable by adjusting means 33 in order to properly center the pair of spots 22 and 26 on the PSD 30 during the calibration procedure. This mechanical setting only depends on the installation height of the sensor. The lens 32 can be translated horizontally using an eccentric screw.

As the sensor is using several different LEDs on the PSD, it is then easy to verify the integrity of the PSD sensor by checking that the two diodes are generating different readings at the output of the PSD.

REFERENCE NUMERALS 10 first LED
12 second LED
14 transmitter lens
16 optical axis of lens 14
18 first infrared beam
18' first infrared beam
20 second infrared beam
20' second infrared beam
22 first spot
24 object or ground
24' displaced object
26 second spot
28 mechanically adjusted distance
30 PSD
32 receiver lens
33 adjustment means
34 optical axis of lens 32
36 horizontal adjustability of lens 32
38 horizontal adjustability of lens 32
40 focal length of the optic
42 distance between sensor and object 24
44 amplifier
46 amplifier
48 potentiometer
50 differential amplifier
52 digital processor (CPU)

The invention claimed is:

1. Measurement sensor comprising a PSD (30) as an optoelectronic receiver, said PSD generating output signals (I1, I2); a transmitter (10, 12) for generating spots (22, 26), optics (14, 32) for reproducing said spots (22', 26') on said PSD (30) and means (44, 46, 48, 50, 52) for processing output signals (I1, I2) generated by said PSD (30) and for controlling the said transmitter (10, 12) depending on said processed output signals (I1, I2) in order to measure the distance between a target (24) and said sensor by a triangulation technique, characterized in that said transmitter comprises at least two optoelectronic signal sources (10, 12) for projecting at least two spots (22, 26) independent from each other on a target (24), said means (44, 46, 48, 50, 52) comprising a digitally controlled potentiometer (48) for balancing the output signals (I1, I2) and a digital processor (52) adapted for controlling the potentiometer (48).

2. Sensor according to claim 1, characterized in that the digital processor (52) is adapted to control the at least two optoelectronic signal sources (10, 12).

3. Sensor according to claim 1, characterized by memory means for storing values for setting the potentiometer (48).

4. Sensor according to claim 3, characterized in that the at least two optoelectronic signal sources (10, 12) are different IR LEDs.

5. Sensor according to claim 4 characterized in that the optics (14, 32) comprises one transmitter lens (14) for projecting spots (22, 26) from the at least two optoelectronic signal sources (10, 12) on the target (24) and one receiver lens (32) for projecting the spots (22, 26) reflected from the target (24) on the PSD (30).

6. Sensor according to claim 5, characterized by mechanical adjustment means (33) provided for adjusting the position of the receiver lens (32) so that the spots are reflected on the PSD (30).

7. Sensor according to claim 3, characterized in that the optics (14, 32) comprises one transmitter lens (14) for projecting spots (22, 26) from the at least two optoelectronic signal sources (10, 12) on the target (24) and one receiver lens (32) for projecting the spots (22, 26) reflected from the target (24) on the PSD (30).

8. Sensor according to claim 2 characterized in that the at least two optoelectronic signal sources (10, 12) are different IR LEDs.

9. Sensor according to claim 2, characterized in that the optics (14, 32) comprises one transmitter lens (14) for projecting spots (22, 26) from the at least two optoelectronic signal sources (10, 12) on the target (24) and one receiver lens (32) for projecting the spots (22, 26) reflected from the target (24) on the PSD (30).

10. Sensor according to claim 1 for use in an automatic door opener and shutter.

11. Sensor according to claim 1 characterized in that the at least two optoelectronic signal sources (10, 12) are different IR LEDs.

12. Sensor according to claim 1, characterized in that the optics (14, 32) comprises one transmitter lens (14) for projecting spots (22, 26) from the at least two optoelectronic signal sources (10, 12) on the target (24) and one receiver lens (32) for projecting the spots (22, 26) reflected from the target (24) on the PSD (30).

13. Distance measurement method wherein at least two optoelectronic signal sources (10, 12) project at least two spots (22, 26) on a target (24), optics (14, 32) reproduces the at least two spots (22', 26') on an PSD (30) generating output signals (I1, I2), and means (44, 46, 48, 50, 52) process the output signals (I1, I2) and control said at least two optoelectronic signal sources (10, 12) depending on the processed output signals (I1, I2) in order to measure the distance between a target (24) and said sensor by a triangulation technique, and a digitally controlled potentiometer (48) sequentially balances the output signals (I1, I2) of the respective signal generated by said at least two spots in the PSD (30).

14. Method according to claim 13, characterized in that the means (44, 46, 48, 50, 52) control said at least two optoelectronic signal sources (10, 12) in that spots (22, 26) are projected sequentially on said target (24) and their respective positions are successively analyzed by the means (44, 46, 48, 50, 52).

15. Method according to claim 14, characterized in that the monitoring of the sensor detection capabilities integrity is done by analyzing the signal outputs variations between at least two different spots.

16. Distance measurement method according to claim 13 for use in an automatic door opener and shutter.

17. Measurement sensor comprising: a PSD (30) as an optoelectronic receiver; a target (24); a transmitter (10, 12) for generating spots (22, 26) on a target; optics (14, 32) for producing spots (22', 26') on said PSD (30) corresponding to spots (22,26) on said target; said PSD) generating output signals (I1,I2) depending on the position of said spots (22', 26') on said PDS (30); current amplifiers (44, 46) which amplify current signals (I1, 12); a digitally controlled potentiometer (48), said digitally controlled potentiometer includes a variable position wiper; a differential comparator (50); said differential comparator has a first voltage input V1 and a second voltage input V2, a CPU (52) for processing said output signals (I1, I2) generated by said PSD) (30) and for controlling said transmitter (10, 12) depending on said amplified output signals (I1, I2) in order to measure the distance between said spots on said target (24) and said sensor by a triangulation technique, said transmitter comprises at least two optoelectronic signal sources (10, 12) for projecting said spots (22, 26) independently from each other on said target (24), said amplifiers (44, 46), said digitally controlled potentiometer (48), said comparator 50, and said CPU (52) controlling said potentiometer (48) as a function of the amplified magnitudes of I1 and I2 such that said voltages V1 and V2 are equal and said wiper positions of said digital potentiometer corresponding to said equal voltages V1 and V2 for said spots (22, 26) being stored in EPROM.

18. Measurement sensor as claimed in claim 17 wherein said spots (22, 26) are transmitted sequentially and in synchronization with said digital potentiometer positions.

19. Measurement sensor as claimed in claim 17 wherein said spots (22, 26) are on a displaced target (24') which produce spots on said PSD (30) and currents which are amplified by amplifiers (44, 46) and which produce unequal voltages V1 and V2 across said potentiometer.

* * * * *

UNITED STATES PATENT AND TRADEMARK OFFICE
CERTIFICATE OF CORRECTION

| | | |
|---|---|---|
| PATENT NO. | : 7,154,112 B2 | Page 1 of 1 |
| APPLICATION NO. | : 10/972831 | |
| DATED | : December 26, 2006 | |
| INVENTOR(S) | : Emmanuel Eubelen | |

It is certified that error appears in the above-identified patent and that said Letters Patent is hereby corrected as shown below:

On Title Page Item 57
In the Abstract paragraph, line 9; change "disclose" to --disclosed.-- and delete the word "closed"

Column 7, line 46, after "that" insert --said--

Signed and Sealed this

Thirteenth Day of March, 2007

JON W. DUDAS
*Director of the United States Patent and Trademark Office*